United States Patent [19]

Musgrove

[11] Patent Number: 4,768,827
[45] Date of Patent: Sep. 6, 1988

[54] STOWABLE CAR SEAT FOR CHILDREN

[76] Inventor: Marcia A. Musgrove, 709 W. Fourth, Webb City, Mo. 64870

[21] Appl. No.: 64,655

[22] Filed: Jun. 22, 1987

[51] Int. Cl.⁴ .............................................. A87C 15/00
[52] U.S. Cl. ...................................... 297/236; 297/15; 297/233; 297/237
[58] Field of Search ............... 297/237, 238, 236, 234, 297/233, 232, 235, 105, 106, 115, 15

[56] References Cited

U.S. PATENT DOCUMENTS

| | | | |
|---|---|---|---|
| 901,581 | 10/1908 | Austin | 297/15 |
| 1,173,351 | 2/1916 | Herington | 297/15 |
| 1,276,970 | 8/1918 | Schramm | 297/15 |
| 1,852,465 | 4/1932 | Mackey et al. | 297/233 |
| 2,058,299 | 10/1936 | Cook | 297/237 X |
| 4,533,176 | 8/1985 | Wyttenbach | 297/15 X |
| 4,555,135 | 11/1985 | Freeland | 297/238 |
| 4,664,443 | 5/1987 | Casale | 297/238 |

FOREIGN PATENT DOCUMENTS

| | | | |
|---|---|---|---|
| 2807064 | 8/1979 | Fed. Rep. of Germany | 297/237 |
| 9927 | 3/1895 | Switzerland | 297/236 |

Primary Examiner—Francis K. Zugel
Attorney, Agent, or Firm—Hovey, Williams, Timmons & Collins

[57] ABSTRACT

A seat assembly for vehicles such as automobiles or passenger trains comprises a child-sized seat which is shiftable between an extended position for use atop an adult-sized chair, and a retracted position recessed within a chamber of the adult chair when use of the latter is instead desired. The child seat is comprised of a molded, generally U-shaped base and back which are pivotally interconnected to enable the child seat to assume a low profile, folded disposition when the child seat is recessed within the chamber of the adult chair. A cushioned panel, pivotally coupled to the back of the adult chair, rests on the folded child seat when the latter is in its retracted, non-use position for comfortable support of an adult using the adult chair. A lever mechanism and guide track arrangement provide proper movement of the child seat between its extended position for use and its recessed, non-use position.

3 Claims, 2 Drawing Sheets

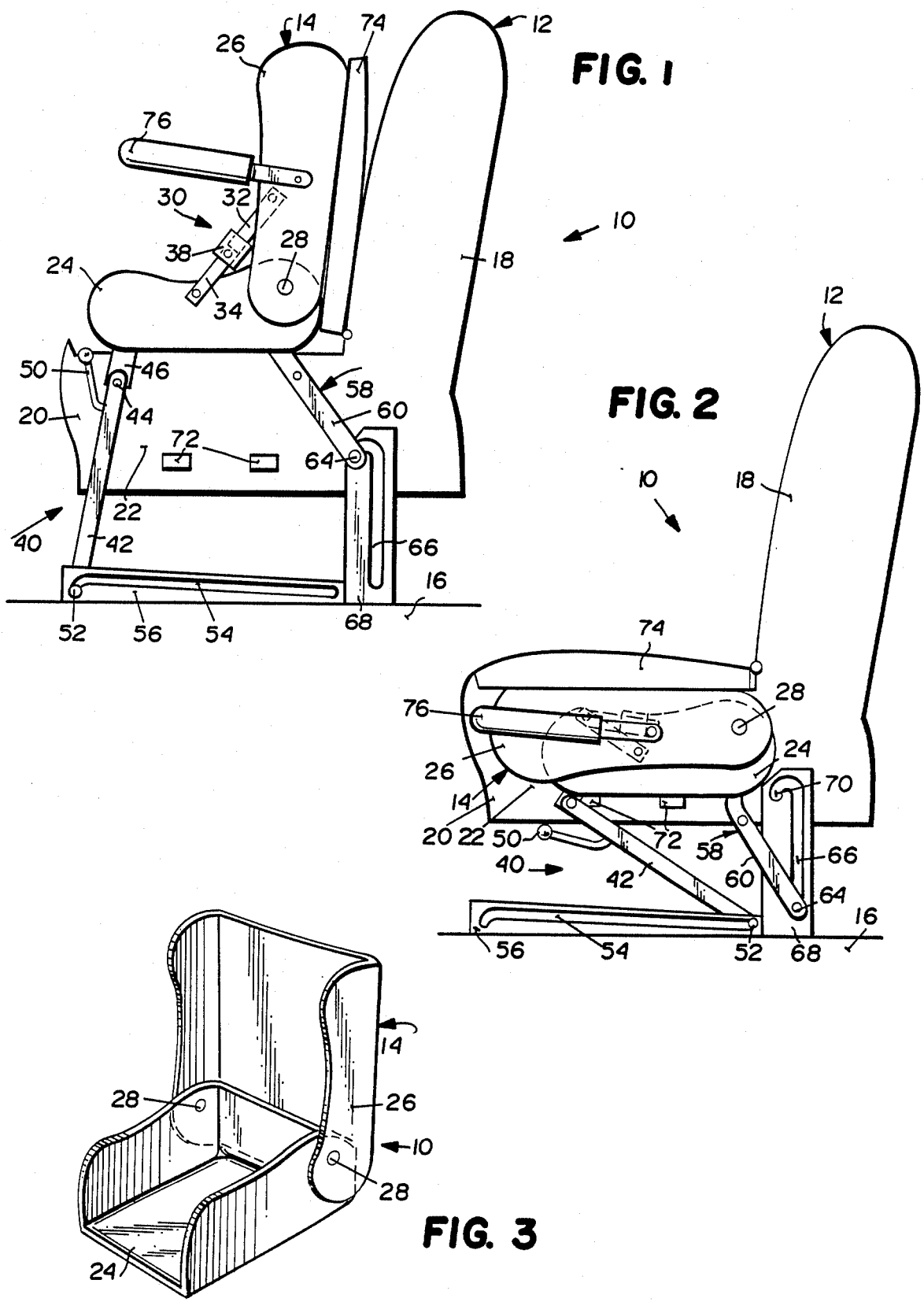

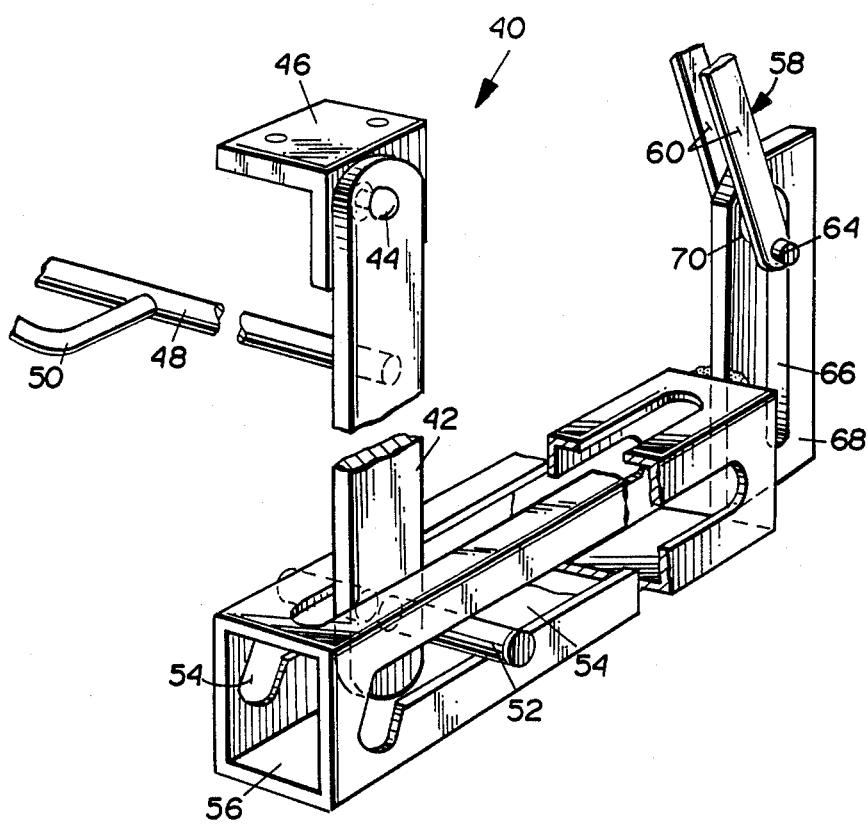
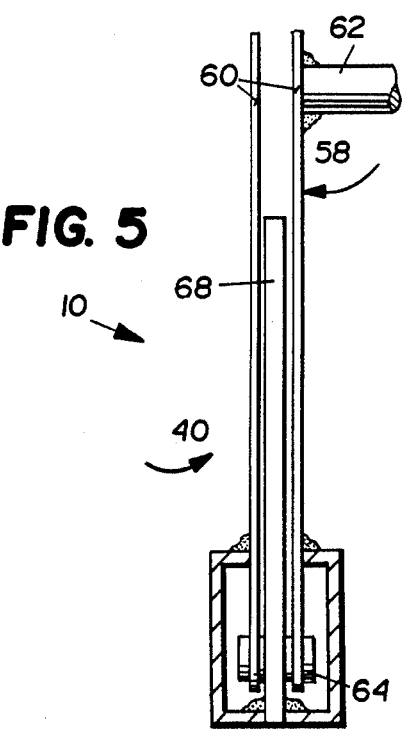
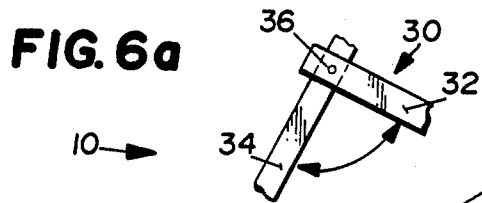
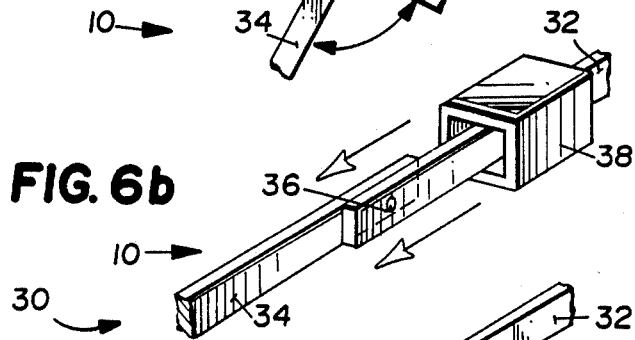
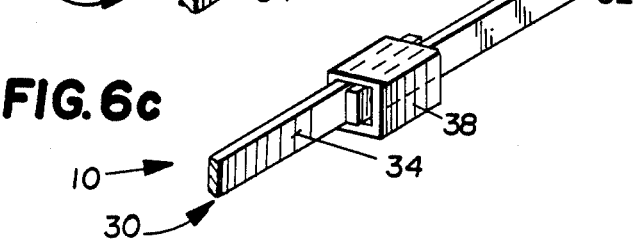

STOWABLE CAR SEAT FOR CHILDREN

BACKGROUND OF THE INVENTION

1. Field of the Invention

This invention relates to a seat assembly for vehicles such as automobiles, vans, buses, passenger trains or aircraft. More particularly, the invention concerns a seat assembly which includes an adult chair and a child seat which is shiftable between an extended position for use atop the adult chair and a retracted position recessed within a chamber of the adult chair for alternatively enabling use of the latter. In preferred embodiments of the invention, the child seat is comprised of a molded, generally U-shaped base which is pivotally connected to a complementally configured back so that the seat may assume a folded disposition when recessed within the chamber of the adult chair.

2. Description of the Prior Art

The safety of small children who are traveling in vehicles is a matter of serious concern. Indeed, in recent years a number of states have enacted legislation requiring the use of car seats or carriers for children traveling in automobiles.

In general, child seats or carriers must be securely connected to the vehicle so that in the event of a sudden stop or collision the seat does not become dislodged and move freely within the passenger compartment. In addition, it is important that the seat be provided with a restraint bar and/or straps so that the child is securely retained for protective purposes within the confines of the seat.

In the past, therefore, a wide variety of car seats have been proposed along with a number of means for securing the seat to the adult chair normally furnished in vehicles. Due to the wide variety of automobile seats which may be encountered, child seats normally include a bar which is inserted into the space between the adult chair seat and back, and the seat belt of the adult chair is then trained around structure of the child seat and drawn tight to prevent movement of the latter relative to the adult chair.

As a consequence, a considerable time and effort is necessary for installing or removing child carriers in the adult chairs of vehicles. For example, the seat belt associated with the adult chair may be difficult to locate and reach, and the brace or bar extending from the child carrier may not readily fit within certain types of automobile seats such as bucket seats or the chairs found in smaller vehicles. The frustrations of placing and securing the child seat are increased where, for instance, the child seat is to be installed in the rear seat of a two-door vehicle.

Moreover, failure of the adult to properly tie the child seat to the adult chair with the seat belt may create a false sense of security when, in reality, the child seat may become readily disengaged from the seat during a collision. As can be appreciated, it would therefore be a desirable advance in the art if a child seat were provided which is permanently affixed to the vehicle but which also enables the normal use of the adult chair when needed.

SUMMARY OF THE INVENTION

My present invention overcomes the disadvantages noted above by provision of a child's car seat which is stowable when unneeded within a chamber formed in a cushion of an adult-sized vehicular seat. The child seat is readily shiftable between its retracted, non-use position and an extended position for use atop the adult seat so that the problems associated with removal and installation of prior art child carriers or seats are avoided.

In preferred forms of my invention, the child seat comprises a base and back which are each molded of plastic and present a generally U-shaped configuration. The base and back are pivotally interconnected to enable swinging movement of the back to an upright position for use when the child seat is in its extended position for use, and a folded orientation in flat, face-to-face relationship with the back of the child seat when the latter is retracted to its non-use position within the chamber of the adult-sized chair. In this manner, the overall size of the child seat is reduced to a low-profile, compact package to facilitate reception of the seat within the chamber of the adult-sized seat.

In certain embodiments of the invention, the chamber is formed within the seat or lower cushion of the adult chair, and a cushioned panel is movable to a position resting above the back of the child seat when the child seat is in its retracted and folded disposition so that the adult chair can instead be used. When it is necessary to raise the child seat to its unfolded and extended orientation, the cushioned panel is lifted and swung to an upright orientation in contact with the back cushion of the adult chair. However, it is also possible and within the scope of the invention for a chamber to alternatively be formed within the upright back cushion of the adult chair, so that the child seat when folded can instead be shifted to a recessed or retracted position within the back cushion of the adult chair.

A lever mechanism securely interconnects the child seat and the frame of the vehicle, thus preventing accidental dislodgement of the child seat as is sometimes the case with conventional child car seats when the vehicle is involved in an accident. A track arrangement smoothly guides the movement of the levers during retraction of the child seat until the base of the latter comes into contact with stops located within the chamber of the adult-sized chair. Optionally, two links pivotally coupled to the base and the back of the child seat are interconnected by a knuckle joint which can be locked to selectively retain the child seat in its unfolded disposition for use.

BRIEF DESCRIPTION OF THE DRAWINGS

FIG. 1 is a schematic, side elevational view of the vehicular seat assembly of my present invention, illustrating a child seat of the assembly which has been moved to an extended position and unfolded disposition for use by a child;

FIG. 2 is a schematic, side elevational view somewhat similar to FIG. 1 except that the child seat has been folded and shifted toward a retracted position within a chamber formed in the seat of the adult-sized chair;

FIG. 3 is a perspective view of the child seat alone that is shown in FIGS. 1 and 2 with cushions, mounting brackets and a safety bar removed to show the generally U-shaped configuration of the pivotally interconnected child seat back and base;

FIG. 4 is an enlarged, fragmentary perspective view of a lever mechanism and guide track arrangement of the seat assembly shown in FIGS. 1 and 2 for shifting of the child seat between an extended and a retracted position;

FIG. 5 is an enlarged, fragmentary, front elevational view of one of the rear pair of levers and guide tracks; and FIGS. 6a, 6b and 6c are enlarged, fragmentary, perspective views of the foldable linkage assembly for retaining the child seat back in an upright position for use, and depicting for exemplary purposes steps involved in locking of the linkage assembly.

DETAILED DESCRIPTION OF THE DRAWINGS

A vehicular seat assembly is shown in FIGS. 1–6 and is broadly designated by the numeral 10. The seat assembly 10, in general, includes an adult-sized chair 12 and a relatively smaller, child-sized seat 14, although it is to be understood in this regard that an infant carrier or the like may be substitued for the child seat shown in the drawings with equally satisfactory results.

Referring to FIGS. 1 and 2, the adult chair 12 is rigidly affixed by legs (not shown) to a frame 16 of a vehicle such as an automobile, bus, passenger train or the like. The adult chair 12 includes an upright, cushioned back 18 and a horizontally extending, cushioned seat 20. Means such as interior wall sections of the adult chair 12 define a chamber 22 within the chair seat 20.

The child-sized seat 14, as depicted in FIGS. 1–3, includes a base 24 and a seat back 26. Both the base 24 and the back 26 may be molded of synthetic resinous materials and, although not shown, lined with a cushioned material for comfort of the child passenger.

Each of the child seat base 24 and seat back 26 are of a generally U-shaped configuration (see FIG. 3) in transverse section, and upstanding marginal edge portions of the base 24 are provided with pivots 28 connected to outwardly turned edge portions of the seat back 26, for selective swinging movement of the latter relative to the seat base 24. The seat back 26 may be shifted to an upright disposition for use as is shown in FIGS. 1 and 3, or alternatively may be moved about pivots 28 to a non-use, folded disposition wherein the seat back 26 is in generally parallel, face-to-face relationship with the seat base 24 as is illustrated in FIG. 2.

Referring to FIGS. 1, 2 and 6, a means for selectively retaining the child seat back 26 in an upright position comprises linkage assemblies 30 that are located on each side of the child seat 14. Each of the linkage assemblies 30 includes a first link 32 that is pivotally coupled to the outwardly extending, turned marginal edge portions of the seat back 26. A second link 34 of each linkage assembly 30 is pivotally connected to the upturned edge portions of the seat base 24. The links 32, 34 are swingably interconnected by a pivot 36 as is shown in FIGS. 6a and 6b.

A rectangular, tubular collar 38 is slidable along the length of first link 32 toward and away from a position covering the pivot 36. When the collar 38 is shifted in the direction of the arrows as is shown in FIG. 6b until reaching a location covering the pivot 36 as depicted in FIG. 6c, internal walls of the collar 38, being closely complemental to the shape of links 32, 34, prevent swinging movement of the link 32 relative to link 34 and lock the same in an aligned, parallel disposition (see also FIG. 1) for thus retaining the seat back 26 in an upright orientation. The child seat 14 may be readily folded to the disposition shown in FIG. 2 once the collar 38 is moved along first link 32 away from pivot 36.

A lever mechanism 40 interconnects the child seat 14 to the frame 16 of the vehicle for shifting movement of the seat 14 toward and away from chamber 22 formed in the seat 20 of adult chair 12. The lever mechanism 40 includes a front pair of links or levers 42 disposed on opposite sides of the child seat 14 and pivotally interconnected thereto by means of a rivet 44 that passes through an upper end portion of each lever 42. Viewing FIG. 4, the rivet 44 extends through an angle bracket 46 that is fixed to the underside of the base 24 of child seat 14. A horizontally extending rod 48 is secured on opposite ends to mid-portions of the front levers 42, and an upturned handle 50 (see also FIGS. 1 and 2) is connected to the center of rod 48.

A lower end segment of each of the front levers 42 fixedly carries a horizontal pin 52 that is slidable along the confines of a first guide track means or channel 54 formed on opposite sides of a rectangular guide track tubing 56. The channel 54 extends along the tubing 56 in a generally horizontal path, although the front end portion of channel 54 extends a short distance in a downward direction which can best be appreciated by reference to FIG. 4.

The lever mechanism 40 for raising and lowering the child seat 14 also includes a rear pair of links or levers 58, one of which is shown in FIGS. 1–2 and FIGS. 4–5. Each lever 58 is comprised of two substantially identical bars 60, 60 (FIGS. 4 and 5), the upper ends of which are fixed to a rear portion of the base 24 of child seat 14. Referring to FIG. 5, a horizontal rod 62 extends between and couples the inner bars 60, 60 of levers 58, 58 respectively.

A horizontal, relatively short pin 64 interconnects lower end portions of the bars 60 and is slidably received in a second guide track means or channel 66 formed in an upright plate 68. The major extent of the channel 66 which has a J-shaped configuration lies in a vertical orientation, with the upper end of the channel 66 curving in an arc until ending in a downturned end region that is designated by the numeral 70.

The lever mechanism 40 is operable to shift the child seat 14 from an upper or extended position which is depicted in FIG. 1 and a lower or recessed position that is shown in FIG. 2. In the position for use of the child seat 14, the front pair of levers 42 are disposed such that the pin 52 is located in the forward, downturned portion of the channel 54, and the rear pair of levers 58 are oriented such that the pins 64 connected thereto are resting within the downturned end region 70 of the channel 66. Although not depicted, a latch arrangement may be employed to ensure that the pins 52, 64 do not become dislodged from the downturned portions of their respective channels 54, 66 when the vehicle encounters a large pothole or the like.

When the child seat is not needed, collar 38 of the linkage assembly 30 is shifted away from the pivot 36 to enable relative movement between the links 32, 34 and to allow the back 26 of the child seat 14 to be shifted about the pivots 28 to the folded disposition that is shown in FIG. 2. Next, handle 50 is grasped by the user to lift the pins 52 out of the downturned, front end portions of the channels 54, while the rear of the child seat 14 is also grasped to lift the pins 62 out of the downturned end regions 70 of respective channels 66. Once the handle 50 has been moved sufficiently to push the front pair of levers 42 past vertical and toward an inclined disposition extending downwardly and rearwardly of the vehicle, the child seat 14 can be lowered toward its retracted position within the chamber 22 until contacting stops 72 that are fixed to the adult chair 12.

A cushioned panel 74, as illustrated in FIGS. 1 and 2, is pivotally connected to the back 18 of the adult chair 12 for swinging movement. When the child seat 14 is in the extended disposition as shown in FIG. 1, the panel 74 is disposed in an upright orientation between the back 26 of the child seat 14 and the back 18 of the adult chair 12. Alternatively, once the child seat 14 has been folded and shifted to its recessed position within the chamber 22, panel 74 may be moved downwardly until assuming a generally horizontal orientation that is shown in FIG. 2.

The panel 74, when in its horizontal disposition, substantially covers the opening in the adult chair seat 20 which forms the chamber 22. The panel 74, when horizontal, rests on the rear of the child seat back 26, and thereby safely and comfortably carries the weight of an adult sitting in the adult chair 12.

Finally, a U-shaped safety bar is pivotally secured to opposite, outwardly-turned side portions of the child seat 14 for maintaining the child in place. When use of the child seat 14 is unnecessary, then the safety bar 76 may be pivoted upwardly from the position shown in FIG. 1 to the orientation shown in FIG. 2, so that the folded child seat 14 can be received within the confines of the adult chair chamber 22.

From the foregoing, it should be apparent to those skilled in the art that my invention provides an especially effective chair assembly 10 which can be readily adapted to carry either a full-sized adult or, alternatively, a child. It is to be realized, of course, that various modifications or additions may be effected to my currently preferred embodiment chosen to illustrate the invention without departing from the gist and essence of my contribution to the art. For example, the child seat 14 may alternatively be of slightly different construction than as is shown, and a variety of straps and the like may be secured to the child seat 14 as an additional means for restraining the child in the seat. As a consequence, it is to be emphasized that the scope of the invention should be deemed to be limited only by a fair interpretation of the claims which follow.

I claim:

1. In a vehicular seat assembly including an adult chair having a seat, a back and means defining a chamber in said adult chair seat, and a child seat including a base, a back and means pivotally coupling said base to said child seat back for moving the latter between an upright, use position and a generally horizontal, storage position, said child seat base including a front portion and a rear portion, means for selectively shifting said child seat between a retracted, non-use position substantially within said chamber and an extended, use position protruding from said chamber comprising:

a front link having an upper portion and a lower portion;

means coupling said upper portion of said front link to said front portion of said child seat base for swinging movement about a generally horizontal axis;

first guide track means extending in a generally horizontal direction beneath said adult chair seat, said lower portion of said front link being shiftably connected to said first guide track means for movement between an upright, downwardly and forwardly extending orientation when said child seat is in said use position and an inclined, downwardly and rearwardly extending orientation when said child seat is in said non-use position;

a rear link having an upper portion and a lower portion, said upper portion of said rear link being fixedly secured to said rear portion of said child seat base;

second guide track means extending in an upright direction and presenting an upper region, said lower portion of said rear link being shiftably coupled to said second guide track means for movement along the latter as said child seat is moved between said use position and said non-use position; and means for selectively retaining said lower portion of said rear link in said upper region of said second guide track means when said child seat is in said use position for supporting the rear portion of said child seat base as said front link supports said front portion of said child seat base.

2. The invention as set forth in claim 1, wherein said means for selectively retaining said lower portion of said rear link in said upper region of said second guide track means comprises a U-shaped segment of said upper region of said guide track means.

3. The invention as set forth in claim 1, wherein said first guide track means has a front depending section for selectively securing said front link in said upright position.

* * * * *